(No Model.)
J. H. WYATT.
CLOD CRUSHER AND HARROW.
No. 374,569. Patented Dec. 6, 1887.
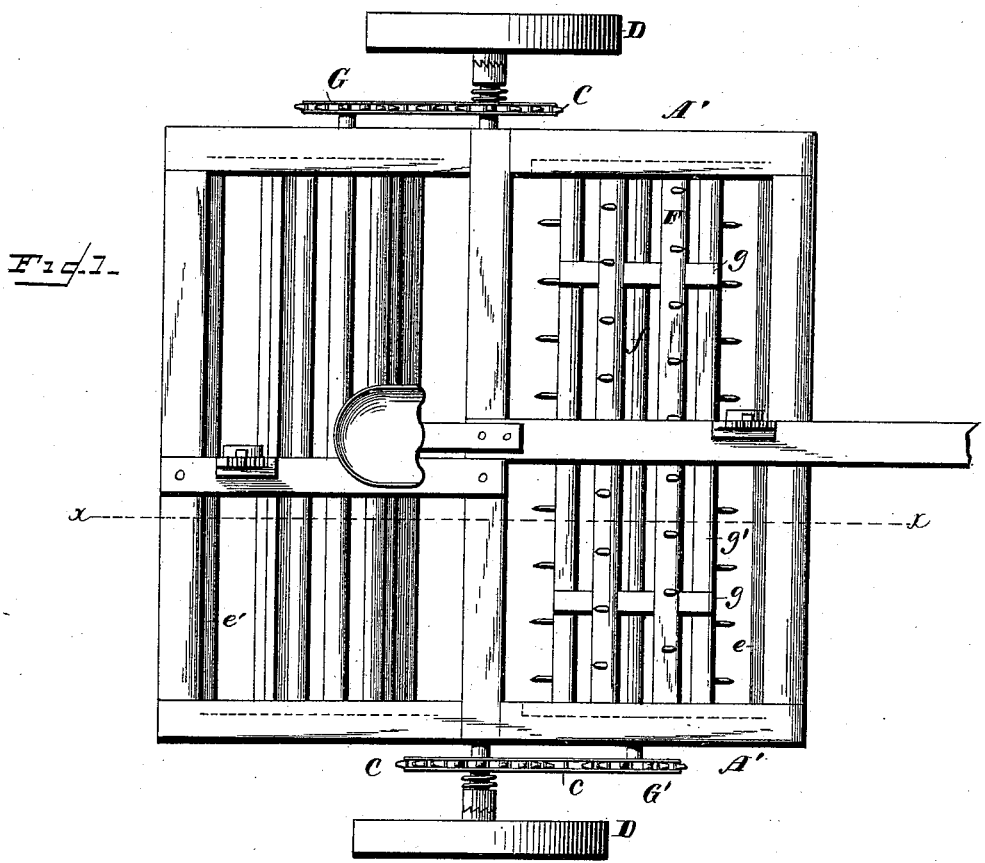
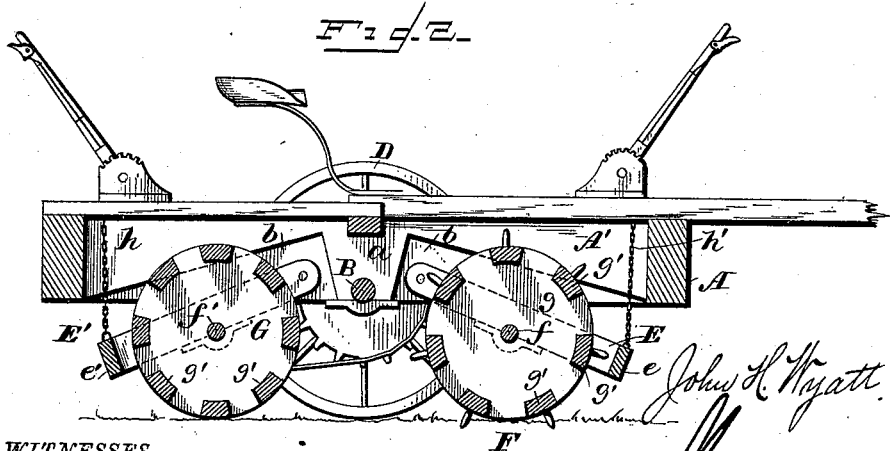
WITNESSES
INVENTOR
John H. Wyatt
Attorney

UNITED STATES PATENT OFFICE.

JOHN H. WYATT, OF VINEY GROVE, ARKANSAS.

CLOD-CRUSHER AND HARROW.

SPECIFICATION forming part of Letters Patent No. 374,569, dated December 6, 1887.

Application filed April 1, 1886. Renewed October 6, 1887. Serial No. 251,674. (No model.)

*To all whom it may concern:*

Be it known that I, JOHN H. WYATT, a citizen of the United States of America, residing at Viney Grove, in the county of Washington and State of Arkansas, have invented certain new and useful Improvements in Combined Clod-Crusher and Harrow; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in combined clod-crushers and harrows; and it consists in the construction and combination of the parts, whereby I am enabled to provide an implement which, when drawn across a field, will cause the rotary harrow to revolve at a comparatively high rate of speed, so as to thoroughly pulverize the earth, said rotary harrow being driven from the clod-crusher and supporting-wheels, which are geared to each other, so as to rotate in unison, as will be hereinafter fully set forth.

In the accompanying drawings, which illustrate my invention, Figure 1 is a plan view of the rotary harrow and clod-crusher constructed in accordance with my invention, and Fig. 2 is a sectional view taken through the line $x\ x$ of Fig. 1.

A refers to a suitably-constructed rectangular frame, which is provided with side pieces, A', having central depending portions, $a$, which form bearings for a transverse shaft, B, which extend under the side pieces of the frame A and have secured thereon sprocket-wheels C C, which are rigidly secured to said shaft or axle. Under these sprocket-wheels spring-clutches of ordinary construction are secured, which engage with the clutch portions of the hubs of the supporting-wheels D, said supporting-wheels being free to rotate upon the axle when the apparatus is moved rearwardly, said wheels rotating with the axle when the apparatus is drawn forwardly. The side pieces, A', of the frame are recessed, as shown at $b$, and within said recesses are pivotally attached bars E and E', each pair of said bars being connected to each other by cross-bars $e$ and $e'$.

To each of the pivoted bars E E is secured the shaft $f$ of the rotary harrow F, said harrow being made up of two or more circular disks, $g\ g$, the peripheries of which are recessed for the reception of bars $g'$, to which the harrow-teeth are secured. The shaft $f$ of the rotary harrow F projects under the frame A, and on a line with the sprocket-wheel C said shaft is provided with a sprocket-wheel, C', said sprocket-wheels being connected to each other by a chain, as shown at $c$.

To the bars E' E', which are pivoted rear of the axle, is journaled the clod-crusher G, which may be constructed similar to the rotary harrow, the bars thereof not being provided with teeth. In practice the bars of this clod-crusher will be much nearer to each other than those of the rotary harrow, and they are of equal diameters. The shaft $f'$ of the clod-crusher extends beyond the frame A, and has a sprocket-wheel, G', rigidly secured thereto, which is connected to the sprocket-wheel on the shaft by a bolt, as shown.

The main frame A is provided centrally with a driver's seat, and to the front and rear of the same are secured levers, which are pivoted to segmental rack-bars attached to the main frame. These levers have cam-shaped ends, and to said ends are secured chains $h$ and $h'$, for elevating the pivoted sections which carry the rotary harrow and clod-crusher.

It will be noted that the diameters of the rotary harrow and clod-crusher are the same, and that the supporting-wheels D D are of a much greater diameter than said harrow and clod-crusher. The clod-crusher and supporting-wheels are geared to each other, so that they will rotate both in the same direction and in unison; or, in other words, the clod-crusher, being much smaller in diameter than the supporting-wheels, is geared to the axle of said supporting-wheels, so that when the clod-crusher contacts with the ground it may make a greater number of revolutions than the supporting-wheels, and the power obtained thereby will be transmitted to the axle in the same ratio as the revolutions of the supporting-wheels.

The amount of contact of the clod-crusher and supporting-wheels upon the ground will be sufficient to rotate the rotary harrow at a comparatively high rate of speed, so as to thoroughly pulverize the earth. This is accomplished by providing the shaft of said rotary harrow with a sprocket-wheel, which is of much smaller diameter than the sprocket-wheel attached to the axle. It will also be noted that the rotary harrow rotates in the same direction as the supporting-wheels and clod-crusher.

The clod-crusher not only serves the purpose of breaking up the clods of earth, but also furnishes a power for rotating the rotary harrow, the contact of the supporting-wheels with the ground not being sufficient for this purpose.

I claim—

In a combined clod-crusher and harrow, a frame provided with a central axle with supporting-wheels, as shown, in combination with a rotary harrow and a clod-crusher which are geared to said axle, the clod-crusher and supporting-wheels being geared to each other, so as to rotate in unison and rotate the harrow faster than the supporting-wheels and clod-crusher, substantially as shown, and for the purpose set forth.

In testimony whereof I affix my signature in presence of two witnesses.

JOHN H. WYATT.

Witnesses:
W. H. BLACKBURN,
W. C. SMITH.